(12) United States Patent
    Choi

(10) Patent No.:    US 12,569,753 B2
(45) Date of Patent:       Mar. 10, 2026

(54) SERVER APPARATUS, EVENT DATA PROCESSING METHOD, AND INFORMATION PROCESSING APPARATUS

(71) Applicant: SONY INTERACTIVE ENTERTAINMENT INC., Tokyo (JP)

(72) Inventor: Jihun Choi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 222 days.

(21) Appl. No.: 18/028,024

(22) PCT Filed: Oct. 5, 2021

(86) PCT No.: PCT/JP2021/036746
    § 371 (c)(1),
    (2) Date: Mar. 23, 2023

(87) PCT Pub. No.: WO2022/080178
    PCT Pub. Date: Apr. 21, 2022

(65) Prior Publication Data
    US 2023/0338836 A1      Oct. 26, 2023

(30) Foreign Application Priority Data
    Oct. 12, 2020    (JP) ................................. 2020-172152

(51) Int. Cl.
    *A63F 13/35*       (2014.01)
    *A63F 13/44*       (2014.01)
    (Continued)

(52) U.S. Cl.
    CPC .............. *A63F 13/35* (2014.09); *A63F 13/44* (2014.09); *A63F 13/53* (2014.09); *A63F 13/798* (2014.09)

(58) Field of Classification Search
    None
    See application file for complete search history.

(56)                References Cited

U.S. PATENT DOCUMENTS

2021/0146261 A1*    5/2021   Hiatt ................... A63F 13/5375

FOREIGN PATENT DOCUMENTS

JP          2010154931 A       7/2010
JP          2011218102 A       11/2011

OTHER PUBLICATIONS

International Search Report and Written Opinion dated Dec. 21, 2021, from PCT/JP2021/036746, 8 sheets.

* cited by examiner

*Primary Examiner* — Damon J Pierce
(74) *Attorney, Agent, or Firm* — Kilpatrick Townsend & Stockton LLP

(57)                ABSTRACT

An event data recording section 240 records event data related to an activity executed by a plurality of players. A play time acquisition section 212 acquires play times of the plurality of players for a task from event data indicating start of the task included in the activity and event data indicating end of the task included in the activity, the event data being recorded in the event data recording section 240. A statistical processing section 220 sorts each of the players into any one of a plurality of classes according to a skill value of the player and determines, on a basis of the play times of the plurality of players in each class, a representative value for the play times in each class for the task. The statistical processing section 220 aggregates representative values for each class to determine the representative value for the play times in each class for the activity.

9 Claims, 18 Drawing Sheets

(51) Int. Cl.
    *A63F 13/53*          (2014.01)
    *A63F 13/798*        (2014.01)

F I G . 3
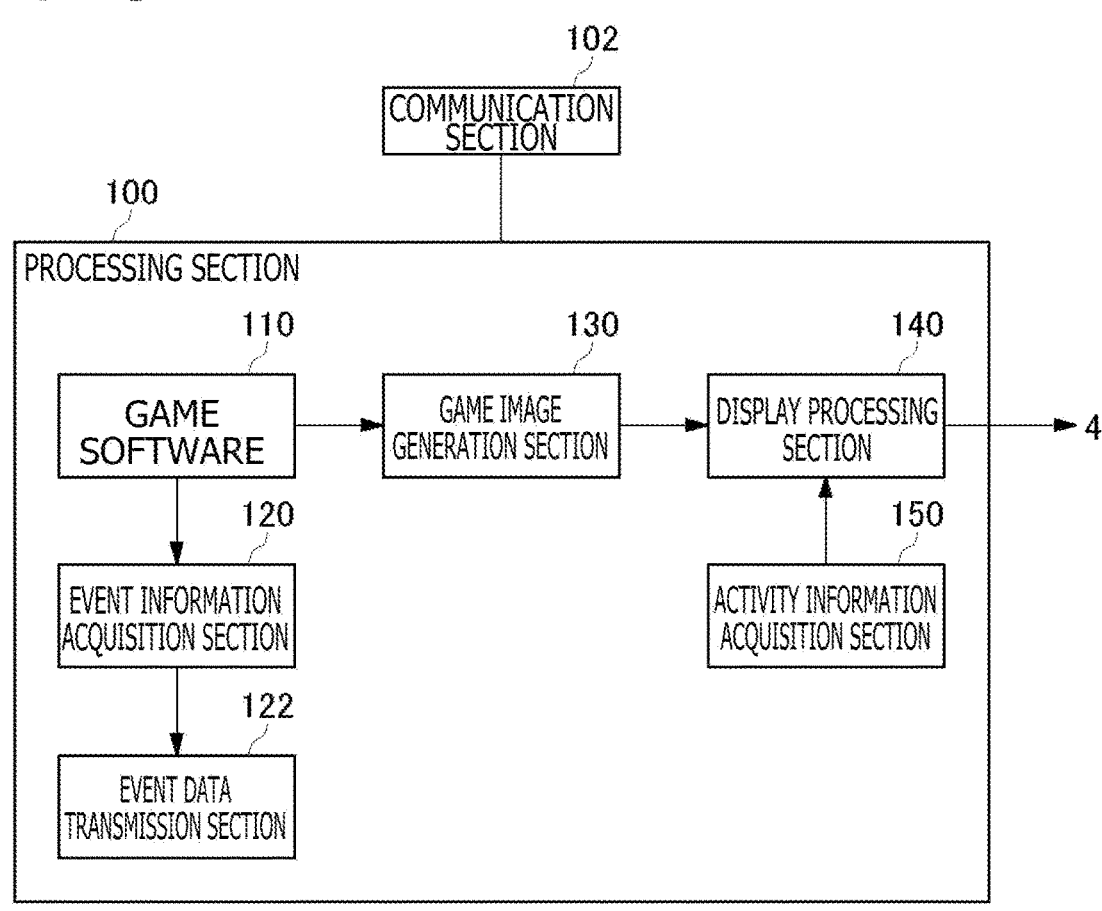
10

F I G . 4
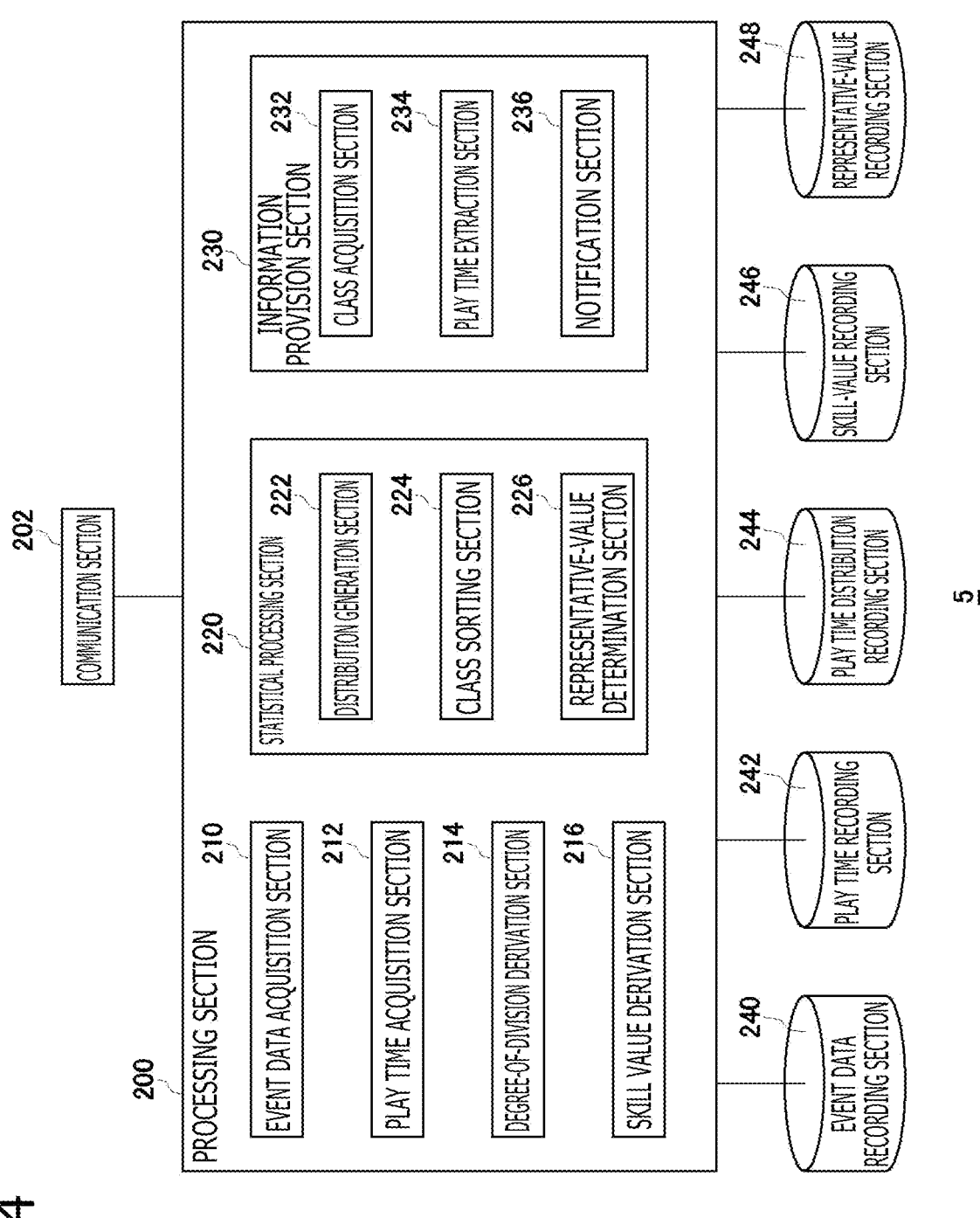

F I G . 5

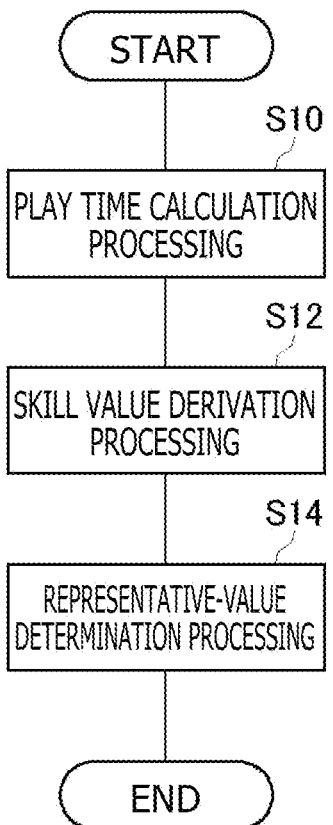

```
        ( START )
            │ S10
  ┌─────────────────────┐
  │ PLAY TIME CALCULATION│
  │      PROCESSING      │
  └─────────────────────┘
            │ S12
  ┌─────────────────────┐
  │ SKILL VALUE DERIVATION│
  │      PROCESSING      │
  └─────────────────────┘
            │ S14
  ┌─────────────────────┐
  │ REPRESENTATIVE-VALUE │
  │DETERMINATION PROCESSING│
  └─────────────────────┘
            │
         ( END )
```

F I G . 6

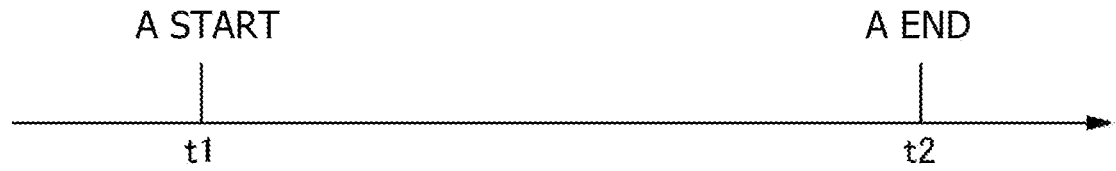

```
  A START                                A END
     │                                     │
─────┼─────────────────────────────────────┼────────►
     t1                                    t2
```

F I G . 7
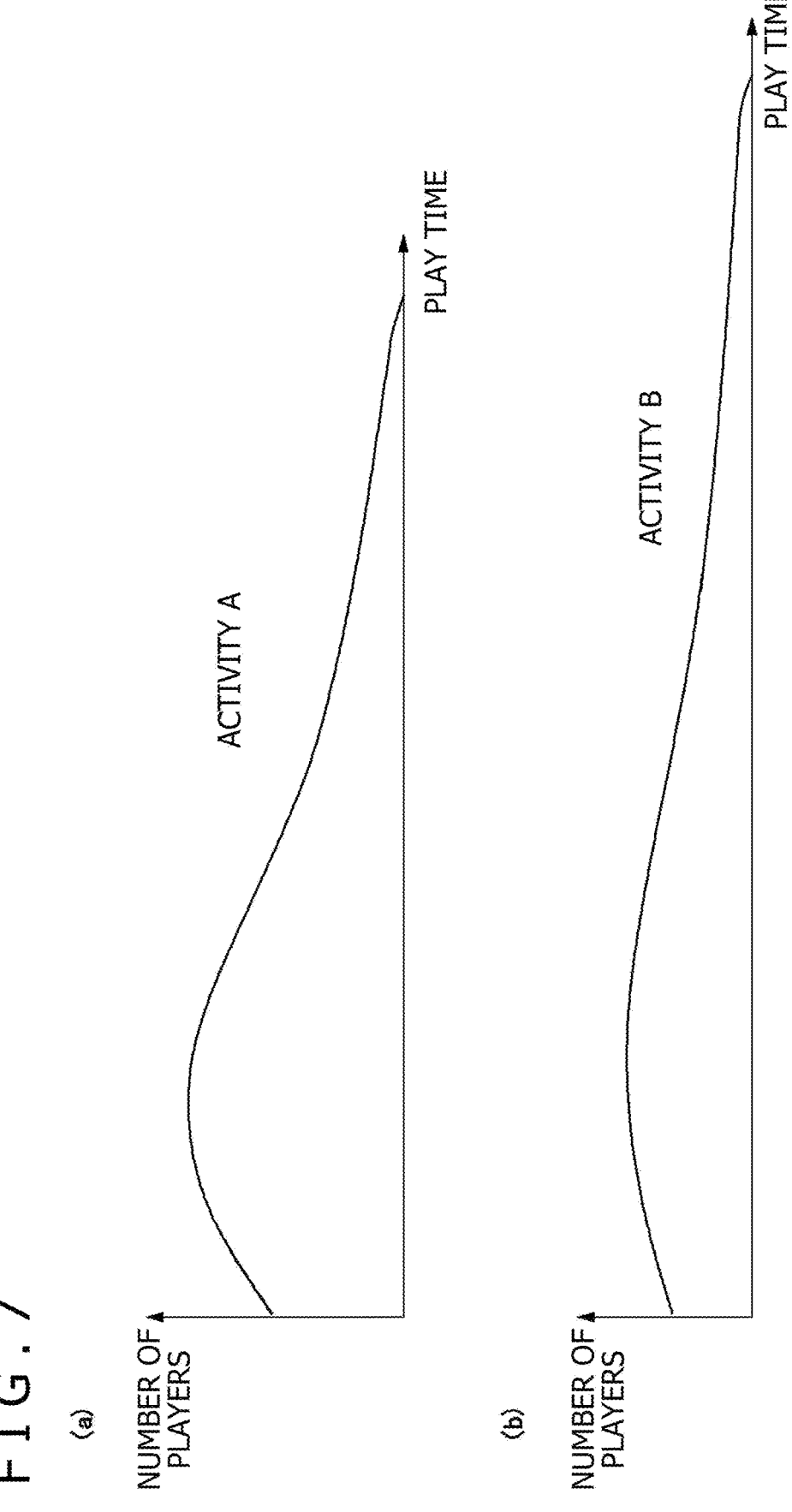

F I G . 8
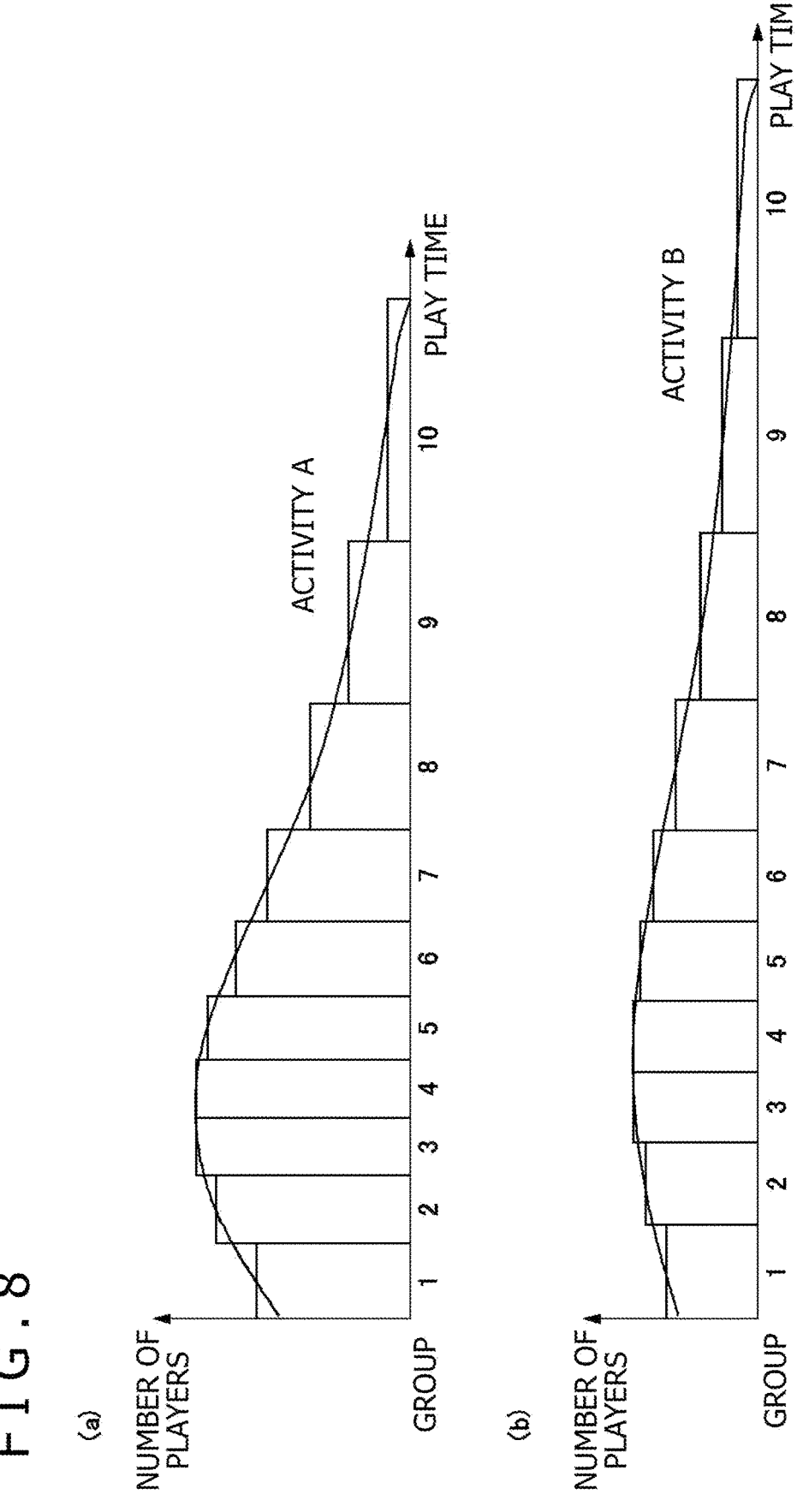
(a)
(b)

F I G . 1 0
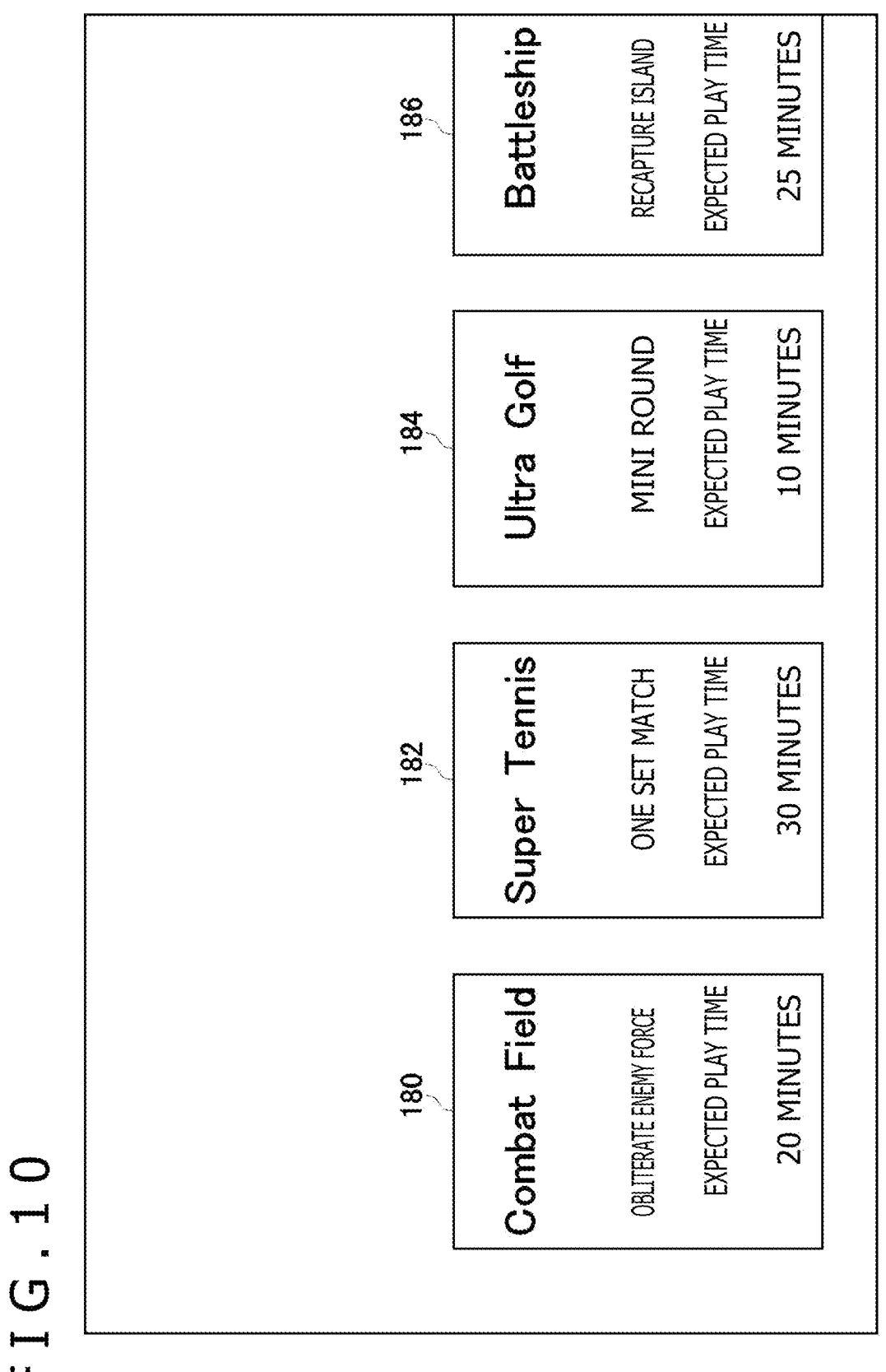

FIG.13

| DEGREE OF DIVISION | RELIABILITY OF PLAY TIME (WEIGHT) |
|:---:|:---:|
| 0 | 1 |
| 1 | 1/2 |
| 2 | 1/4 |
| 3 | 1/8 |
| 4 | 1/16 |
| ... | ... |

FIG. 15

| ACTIVITY | A | B | C | D | E | F | G | H | I | J |
|---|---|---|---|---|---|---|---|---|---|---|
| SKILL VALUE | 3 | 5 | 1 | 2 | 4 | 7 | 5 | 5 | 8 | 10 |

| | A | B | C | D | E | F | G | H | I | J |
|---|---|---|---|---|---|---|---|---|---|---|
| DEGREE OF DIVISION | 0 | 0 | 0 | 0 | 2 | 2 | 3 | 3 | 3 | 3 |
| RELIABILITY (WEIGHT) | 1 | 1 | 1 | 1 | 1/4 | 1/4 | 1/8 | 1/8 | 1/8 | 1/8 |
| NORMALIZED WEIGHT | 1/5 | 1/5 | 1/5 | 1/5 | 1/20 | 1/20 | 1/40 | 1/40 | 1/40 | 1/40 |
| SKILL VALUE × NORMALIZED WEIGHT | 3/5 | 5/5 | 1/5 | 2/5 | 1/5 | 7/20 | 1/8 | 1/8 | 1/5 | 1/4 |

PLAYER SKILL VALUE $= \Sigma$(SKILL VALUE $\times$ NORMALIZED WEIGHT)

FIG.16

| PLAYER | A | B | C | D | E |
|---|---|---|---|---|---|
| PLAYER TIME | 5 | 10 | 15 | 25 | 30 |

| | A | B | C | D | E |
|---|---|---|---|---|---|
| DEGREE OF DIVISION | 0 | 2 | 1 | 3 | 1 |
| RELIABILITY (WEIGHT) | 1 | 1/4 | 1/2 | 1/8 | 1/2 |
| NUMBER OF DUPLICATES | ×8 | ×2 | ×4 | ×1 | ×4 |

F I G . 1 7
| CLASS | 1 | 2 | 3 | 4 | 5 | 6 | 7 | 8 | 9 |
|---|---|---|---|---|---|---|---|---|---|
| REPRESENTATIVE VALUE OF PLAY TIME | 5 | 6.5 | 7 | 8 | 10 | 12 | 14 | 17 | 20 |
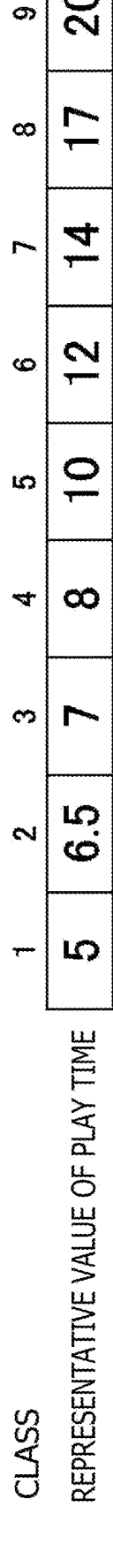

F I G . 1 9

(a) TASK 1

| CLASS | 1 | 2 | 3 | 4 | 5 | 6 | 7 | 8 | 9 |
|---|---|---|---|---|---|---|---|---|---|
| REPRESENTATIVE VALUE OF PLAY TIME | 2 | 2.5 | 3 | 3.5 | 4 | 5 | 6.5 | 8 | 10 |

(b) TASK 2

| CLASS | 1 | 2 | 3 | 4 | 5 | 6 | 7 | 8 | 9 |
|---|---|---|---|---|---|---|---|---|---|
| REPRESENTATIVE VALUE OF PLAY TIME | 1.5 | 2 | 2.5 | 3 | 3.5 | 4 | 5 | 7 | 9 |

(c) TASK 3

| CLASS | 1 | 2 | 3 | 4 | 5 | 6 | 7 | 8 | 9 |
|---|---|---|---|---|---|---|---|---|---|
| REPRESENTATIVE VALUE OF PLAY TIME | 5 | 5.5 | 6.5 | 7 | 7.5 | 9 | 10.5 | 12 | 15 |

(d) ACTIVITY U

| CLASS | 1 | 2 | 3 | 4 | 5 | 6 | 7 | 8 | 9 |
|---|---|---|---|---|---|---|---|---|---|
| REPRESENTATIVE VALUE OF PLAY TIME | 8.5 | 10 | 12 | 13.5 | 15 | 18 | 22 | 27 | 34 |

SERVER APPARATUS, EVENT DATA PROCESSING METHOD, AND INFORMATION PROCESSING APPARATUS

TECHNICAL FIELD

The present invention relates to a technology for processing event data related to a game activity executed by a user.

BACKGROUND ART

In recent years, cloud game services have been diffused in which operation information input by a player is transmitted to a game server and in which the game server generates video and sound of a game corresponding to the operation information and transmits the video and sound to a terminal apparatus of the player. In a cloud game service, the game server manages all of game play, and thus analysis of the play status for an activity executed by the player can be used for improvement of a game scenario, and the like.

On the other hand, current console games do not externally output information indicating the status of game play, and thus the server side fails to analyze the play status of the player. Thus, also in a console game, various types of information related to the game play are preferably transmitted to the server to allow the server to analyze the play status for the activity.

SUMMARY

Technical Problem

When the server collects the play statuses of a plurality of players for an activity, the play times for the activity can be statistically processed. Thus, a mechanism is desirably constructed that is used to provide useful information related to the play time to a user who has not executed the activity yet.

Thus, an object of the present invention is to implement a mechanism for providing information related to the play time for an activity.

Solution to Problem

To solve the above-described problem, an aspect of the present invention provides a server apparatus processing event data related to an activity executed by a plurality of players, the server apparatus including an event data recording section recording event data related to an activity executed by a plurality of players, a play time acquisition section acquiring play times of the plurality of players for the activity from event data indicating start of the activity and event data indicating end of the activity, the event data being recorded in the event data recording section, a statistical processing section sorting each of the players into any one of a plurality of classes according to a skill value of the player and determining, on the basis of the play times of the plurality of players in each class, a representative value for the play times in each class, and a representative-value recording section recording the determined representative value for the play times in each class.

Another aspect of the present invention provides a server apparatus processing event data related to an activity executed by a plurality of players, the activity including a plurality of tasks, the server apparatus including an event data recording section recording event data related to an activity executed by a plurality of players, a play time acquisition section acquiring play times of the plurality of players for each of the tasks from event data indicating start of each task included in the activity and event data indicating end of each task included in the activity, the event data being recorded in the event data recording section, and a statistical processing section sorting each of the players into any one of a plurality of classes according to a skill value of the player and determining, on the basis of the play times of the plurality of players in each class, a representative value for the play times in each class for the task. The statistical processing section determines, for the plurality of tasks, the representative value for the play times in each class and aggregates the representative values for each class to determine the representative value for the play times in each class for the activity.

Another aspect of the present invention provides a method for processing event data related to an activity executed by a plurality of players, the method including the steps of acquiring play times of a plurality of players for an activity from event data indicating start of the activity and event data indicating end of the activity, sorting each of the players into any one of a plurality of classes according to a skill value of the player, and determining, on the basis of the play times of the plurality of players in each class for the activity, a representative value for the play times in each class.

Yet another aspect of the present invention provides a method for processing event data related to an activity executed by a plurality of players, the activity including a plurality of tasks, the method including the steps of acquiring play times of a plurality of players for each tasks from event data indicating start of each task included in the activity and event data indicating end of each task included in the activity, sorting each of the players into any one of a plurality of classes according to a skill value of the player, determining, on the basis of the play times of the plurality of players in each class for the task, a representative value for the play times in each class for the task, and aggregating, for each class, representative values for the play times determined for each class for the plurality of tasks included in the activity to determine the representative value for the play times in each class for the activity.

Still another aspect of the present invention provides an information processing apparatus including an acquisition section acquiring information related to a predicted play time based on a representative value for a play time for a game activity, the representative value being associated with a class of a user, and a display processing section displaying information acquired by the acquisition section.

Note that valid aspects of the present invention include any combinations of the above-described components and a method, an apparatus, a system, a recording medium, a computer program, and the like among which the representation of the present invention is converted.

BRIEF DESCRIPTION OF DRAWINGS

FIG. 3 is a diagram depicting functional blocks of the information processing apparatus.

FIG. 4 is a diagram depicting functional blocks of a server apparatus of an embodiment.

FIG. 5 is a diagram depicting a procedure for analyzing collected event data.

FIG. 6 is a diagram illustrating a technique for calculating a play time.

FIG. 7 is a diagram depicting a relation between the play times for activities and the number of players having executed the activities.

FIG. 8 is a diagram depicting a distribution of play times.

FIG. 10 is a diagram depicting an example of a system screen.

FIG. 13 is a diagram depicting a relation between the degree of division of an activity and the reliability of a calculated play time.

FIG. 15 is a diagram illustrating a process for calculating a player skill value.

FIG. 16 is a diagram illustrating a process for calculating a representative value for the play time.

FIG. 17 is a diagram depicting examples of the representative value for the play time derived for each class.

FIG. 19 depicts the representative values for the play times in classes of respective tasks.

DESCRIPTION OF EMBODIMENT

An outline of the present invention will be described. In an embodiment, an information processing apparatus executes game software. When an activity is started, the game software outputs, to system software, an activity identifier (activity ID) identifying the activity and event information indicating the start of the activity. Additionally, when the activity is ended, the game software outputs, to the system software, the activity ID and event information indicating the end of the activity. When the activity is ended, the game software may include the result of the activity (success or failure) in the event information. The system software adds a game identifier (game ID) identifying a game and time information (time stamp) to the event information output from the game software to generate event data, and transmits the event data to the server apparatus.

The activity is a unit of game play and may be a quest or a mission provided to a user during the progress of a game. As described above, the game software basically outputs event information indicating occurrence of a start event when the activity is started, and outputs event information indicating occurrence of an end event when the activity is ended. However, a game developer can freely set, in the game software, events related to the activity. For example, in a case where the game developer includes a plurality of tasks in one activity, the game software may be configured to output event information for each task instead of outputting event information for the activity. Note that the game software may be configured to output the event information for the activity itself as well as the event information for each task. Thus, the game developer can freely set the presence or absence of output of the event information and output timings in the game software.

The server apparatus collects event data transmitted from a plurality of information processing apparatuses operated by a plurality of players, and analyzes a play trend related to the activity. In particular, the server apparatus of the embodiment statistically processes the play times of a plurality of players for an activity on the basis of the event data transmitted from a plurality of information processing apparatuses. The server apparatus includes a function to notify an expected play time to a user who has not played the activity yet, on the basis of the results of statistical processing.

Figure 1:
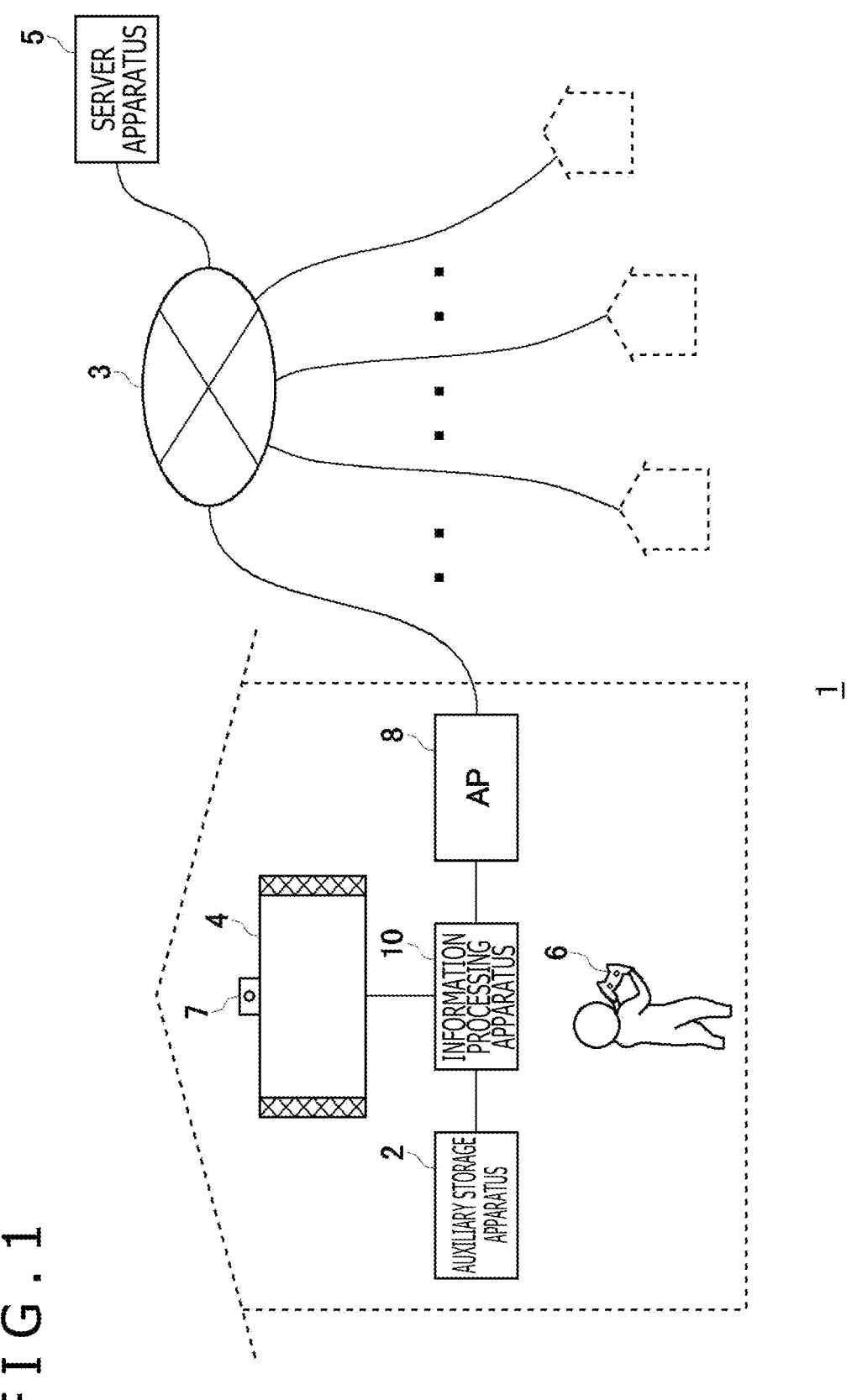
FIG. 1 is a diagram depicting an information processing system according to an embodiment.

FIG. 1 depicts an information processing system 1 according to an embodiment of the present invention. The information processing system 1 of the embodiment is a play time analysis system analyzing the play time for an activity, and includes an information processing apparatus 10 operated by the user and a server apparatus 5. An access point (hereinafter referred to as an "AP") 8 includes the functions of a wireless access point and a router, and the information processing apparatus 10 connects to the AP 8 wirelessly or wiredly and connects communicatively to the server apparatus 5 on a network 3. FIG. 1 depicts one user and one information processing apparatus 10. However, in the information processing system 1, a plurality of the information processing apparatuses 10 operated by a plurality of users and the server apparatus 5 are assumed to be connected via the network 3.

The information processing apparatus 10 connects wirelessly or wiredly to an input apparatus 6 operated by the user, and the input apparatus 6 outputs, to the information processing apparatus 10, information of operation of the user. Upon receiving operation information from the input apparatus 6, the information processing apparatus 10 reflects the operation information in processing of the system software and the game software, and causes the output apparatus 4 to output the results of the processing. In the information processing system 1, the information processing apparatus 10 is a game apparatus (game console) that executes a game, and the input apparatus 6 may be equipment such as a game controller which supplies the operation information of the user to the information processing apparatus 10. Note that the input apparatus 6 may be an input interface such as a keyboard and a mouse.

An auxiliary storage apparatus 2 is a mass recording apparatus such as an HDD (Hard Disk Drive) or an SSD (Solid State Drive), and may be a built-in recording apparatus or an external recording apparatus connecting to the information processing apparatus 10 by a USB (Universal Serial Bus) or the like. The output apparatus 4 may be a television with a display outputting images and a speaker outputting sound. The output apparatus 4 may be connected to the information processing apparatus 10 via a wire cable or wirelessly.

A camera 7 corresponding to an image capturing apparatus is provided near the output apparatus 4 to capture an image of a space around the output apparatus 4. FIG. 1 depicts an example in which the camera 7 is attached to an upper portion of the output apparatus 4. However, the camera 7 may be disposed on a side portion or a lower portion of the output apparatus 4, and is, in any case, disposed at a position where an image of the user located in front of the output apparatus 4 can be captured. The camera 7 may be a stereo camera.

The server apparatus 5 provides network services to the user of the information processing system 1. The server apparatus 5 manages a network account identifying each user, and each user uses the network account to sign in to a network service provided by the server apparatus 5. By signing in to a network service from the information processing apparatus 10, the user can register, in the server apparatus 5, save data of a game and a trophy corresponding to a virtual reward acquired during game play. With the save data or the trophy registered in the server apparatus 5, even when the user uses an information processing apparatus different from the information processing apparatus 10, the user can synchronize the save data or the trophy.

The server apparatus 5 of the embodiment collects event data from a plurality of the information processing apparatuses 10 operated by a plurality of players. The server apparatus 5 statistically processes the play time for the activity from the collected event data, and evaluates, for each activity, the play time corresponding to a player skill value. Additionally, the server apparatus 5 derives the player skill value of the user from the collected event data. On the basis of the play time corresponding to the player skill value of the activity and the player skill value of the user, the server apparatus 5 can notify the user who has not executed the activity yet of the play time corresponding to the player skill value of the user, as an expected play time. Upon receiving the expected play time, the user can determine whether or not to play the activity from the situation of the user (for example, the user needs to go out one hour later, and so on)

Figure 2:
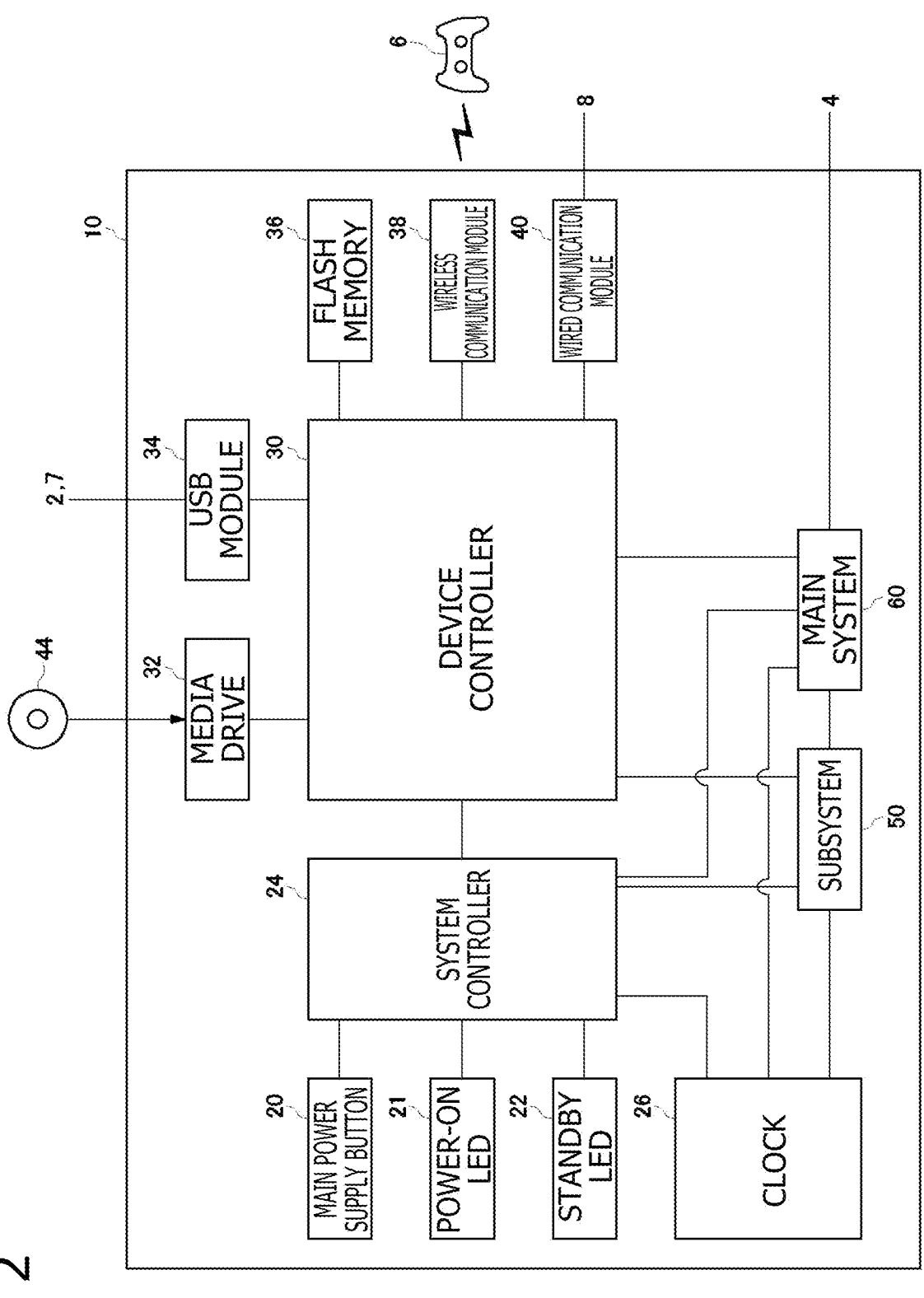
FIG. 2 is a diagram depicting a hardware configuration of the information processing system.

FIG. 2 depicts a hardware configuration of the information processing apparatus 10. The information processing apparatus 10 includes a main power supply button 20, a power-on LED (Light-Emitting Diode) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (Central Processing Unit), a memory and a memory controller corresponding to a main storage apparatus, a GPU (Graphics Processing Unit), and the like. The GPU is mainly utilized for arithmetic processing for game programs. The main CPU includes a function to activate the system software and to execute, under an environment provided by the system software, game programs installed in the auxiliary storage apparatus 2. The subsystem 50 includes a sub-CPU, and a memory and a memory controller corresponding to a main storage apparatus, and includes no GPU.

The main CPU includes a function to execute the game programs installed in the auxiliary storage apparatus 2, whereas the sub-CPU includes no such functions. However, the sub-CPU includes a function to access the auxiliary storage apparatus 2 and a function to transmit and receive data to and from the server apparatus 5. The sub-CPU includes only such limited processing functions and can operate with small power consumption compared to the main CPU. The functions of the sub-CPU are executed while the main CPU is in a standby state.

The main power supply button 20 is an input section to which operation of the user is input, and is provided on a front surface of a housing of the information processing apparatus 10 and operated to turn on and off power to the main system 60 of the information processing apparatus 10. The power-on LED 21 is lighted when the main power supply button 20 is turned on, and the standby LED 22 is lighted when the main power supply button 20 is turned off. The system controller 24 detects depression of the main power supply button 20 by the user.

The clock 26 is a real-time clock and generates the current date and time information and supplies them to the system controller 24, the subsystem 50, and the main system 60.

The device controller 30 is configured as an LSI (Large-Scale Integrated Circuit) that delivers information between devices like a south bridge. As illustrated, the device controller 30 is connected to devices such as the system controller 24, the media drive 32, the USB module 34, the flash memory 36, the wireless communication module 38, the wired communication module 40, the subsystem 50, and the main system 60. The device controller 30 absorbs differences in electrical characteristics among the devices and differences in data transfer rate and controls timings for data transfer.

The media drive 32 is a drive apparatus in which a ROM (Read Only Memory) medium 44 with application software such as games and license information recorded therein is installed and driven and which reads programs and data from the ROM medium 44. The ROM medium 44 is a read-only recording medium such as an optical disc, a magneto-optical disc, or a Blu-ray Disc.

The USB module 34 is a module connecting to external equipment via a USB cable. The USB module 34 may be connected to the auxiliary storage apparatus 2 and the camera 7 via a USB cable. The flash memory 36 is an auxiliary storage apparatus constituting an internal storage. The wireless communication module 38 performs wireless communication with the input apparatus 6 using a communication protocol such as the Bluetooth (registered trademark) protocol or the IEEE (Institute of Electrical and Electronics Engineers) 802.11 protocol. The wired communication module 40 performs wired communication with external equipment and connects to the network 3 via the AP 8.

FIG. 3 depicts functional blocks of the information processing apparatus 10. The information processing apparatus 10 includes a processing section 100 and a communication section 102. The processing section 100 includes game software 110, an event information acquisition section 120, an event data transmission section 122, a game image generation section 130, a display processing section 140, and an activity information acquisition section 150.

In FIG. 3, elements described as functional blocks that execute various types of processing of the information processing apparatus 10 can be configured as circuit blocks, memories, or other LSIs in terms of hardware and implemented by programs loaded in the memory, or the like in terms of software. Consequently, a person skilled in the art understands that these functional blocks can be implemented in various forms using only hardware, only software, or a combination of the hardware and the software, and the functional blocks are not limited to any of these forms.

The game software 110 includes at least a game program, image data, and sound data. The game program receives information regarding operation of the input apparatus 6 by the user, and performs arithmetic processing for moving game characters in a virtual space. The game image generation section 130 includes a GPU (Graphics Processing Unit) that executes rendering processing, and generates image data of a game. The display processing section 140 outputs, from the output apparatus 4, game images generated. Note that the processing section 100 includes a game sound generation section generating game sound data and a sound output section outputting game sound but that the game sound generation section and the sound output section are omitted from FIG. 3.

When an activity is started during the progress of a game, the game program outputs event information indicating occurrence of a start event for the activity. When the activity is ended, the game program outputs event information indicating occurrence of an end event for the activity. Upon acquiring the event information from the game software 110, the event information acquisition section 120 adds, to the event information, the game ID and time information (time stamp) indicating the time of occurrence of the event to generate event data, and provides the event data to the event data transmission section 122. Note that the game program may output, to the event information acquisition section 120, the event information including the game ID and/or the time stamp. The event data transmission section 122 transmits the event data generated to the server apparatus 5 via the communication section 102.

The game developer may incorporate various activities into the game. For example, a battle activity with an enemy boss is incorporated into the game, the game program outputs, at the start of the battle, an activity ID identifying the battle activity and event information including information indicating the start if the battle activity. When the player wins the battle with the enemy boss, the game program outputs the activity ID identifying the battle activity, information indicating the end of the battle activity, and event information including information indicating the success of the activity.

The event data transmission section 122 transmits, to the server apparatus 5 via the communication section 102, event data related to the activity executed by the player. In the information processing system 1, transmission processing for the event data is performed by all of the information processing apparatuses 10 connected to the server apparatus 5. The server apparatus 5 collects event data related to various activities of various games. Preferably, upon acquiring the event information from the game software 110, the event information acquisition section 120 immediately generates event data with the time stamp added thereto, and the event data transmission section 122 transmits the event data to the server apparatus 5.

FIG. 4 depicts functional blocks of the server apparatus 5 of the embodiment. The server apparatus 5 includes a processing section 200, a communication section 202, an event data recording section 240, a play time recording section 242, a play time distribution recording section 244, a skill-value recording section 246, and a representative-value recording section 248. The processing section 200 includes an event data acquisition section 210, a play time acquisition section 212, a degree-of-division derivation section 214, a skill value derivation section 216, a statistical processing section 220, and an information provision section 230. The statistical processing section 220 includes a distribution generation section 222, a class sorting section 224, and a representative-value determination section 226. The information provision section 230 includes a class acquisition section 232, a play time extraction section 234, and a notification section 236.

In FIG. 4, elements described as functional blocks that execute various types of processing of the server apparatus 5 can be configured as circuit blocks, memories, or other LSIs in terms of hardware and implemented by programs loaded in the memory, or the like in terms of software. Consequently, a person skilled in the art understands that these functional blocks can be implemented in various forms using only hardware, only software, or a combination of the hardware and the software, and the functional blocks are not limited to any of these forms.

The event data acquisition section 210 acquires, from a plurality of the information processing apparatuses 10, event data related to an activity executed by a plurality of players, and records the event data in the event data recording section 240. The event data recording section 240 records the event data for each game title in association with the network account of the player. As described above, the event data includes at least the game ID, the activity ID, the information indicating the start or end of the activity, and the time stamp. A procedure will be described below in which the server apparatus 5 analyzes the collected event data.

Example 1

FIG. 5 depicts a procedure for analyzing the collected event data in Example 1. Analysis of the event data includes play time calculation processing (S10) executed by the play time acquisition section 212, skill value derivation processing (S12) executed by the skill value derivation section 216, and representative-value determination processing (S14) executed by the representative-value determination section 226.

<S10: Play Time Calculation Processing>

The play time acquisition section 212 acquires the play time for an activity. The play time acquisition section 212 acquires the play times of a plurality of players for the activity from the event data including start event information of the activity (start event data) and the event data including end event information of the activity (end event data). The play time for the activity is calculated on the basis of the time stamp included in the start event data and the time stamp included in the end event data.

FIG. 6 is a diagram illustrating a calculation technique for the play time. FIG. 6 depicts a start event and an end event of an activity A executed by one player. Specifically, "A Start" indicates the start event of activity A, and "A End" indicates the end event of activity A. The start event data includes a start time t1 of activity A, and the end event data includes an end time t2 of activity A. The play time acquisition section 212 calculates the play time to be (t2−t1). The play time acquisition section 212 records the calculated play time for the activity in the play time recording section 242 in association with the network account of the player along with the game ID and the activity ID.

<S12: Skill-Value Derivation Processing>

In the statistical processing section 220, the distribution generation section 222 generates a distribution of play times for each activity on the basis of the plurality of play times acquired by the play time acquisition section 212. The distribution generation section 222 records, in the play time distribution recording section 244, the distribution of the play times generated for each activity.

FIG. 7(a) and FIG. 7(b) each depict a relation between the play time for one activity and the number of players who have executed the activity. The horizontal axis indicates the play time, and the vertical axis indicates the number of players. FIG. 7(a) depicts a relation between the play time for activity A and the number of players, and FIG. 7(b) depicts a relation between the play time for an activity B and the number of players.

On the basis of the knowledge that the play time for the activity is correlated with the game skill of the user, the server apparatus 5 implements a technology for deriving the skill value of the user and notifying the user of the play time corresponding to the derived skill value. The knowledge indicates that a user with a high game skill completes an activity in a relatively short play time, whereas a user with a low game skill completes an activity in a relatively long play time. Accordingly, a user with a high game skill is predicted to complete both activity A and activity B in a short play time, and a user with a low game skill is predicted to complete both activity A and activity B in a long play time.

FIG. 8(a) and FIG. 8(b) each depict the distribution of play times. The distribution generation section 222 arranges, for each activity, all players in order of increasing play time, and divides all the players into a plurality of groups each including an equal number of players. In Example 1, the distribution generation section 222 divides all the players into 10 groups, 1 to 10, each including the same number of players. In a case where one million players have played activity A, each group includes one hundred thousand players, group 1 is a collection of players with the shortest play time, and group 10 is a collection of players with the longest play time. The distribution generation section 222 records, in the play time distribution recording section 244, the distribution of play times generated for each activity. For example, the play time distribution recording section 244 may record, as the distribution of play times, the group numbers 1 to 10 and the shortest play time and longest play time included in each group in association with one another.

The skill value derivation section 216 derives the skill value of the user for the activity on the basis of the play time of the user for the activity and the distribution of play times for the activity. The skill value derivation section 216 derives the skill value of the user for the activity by referencing the play time distribution recorded in the play time distribution recording section 244 to determine the group number of the group including the play time of the user. In Example 1, the group number may directly represent the skill value. Consequently, in a case where the group with group number 3 includes the play time of the user who has executed activity A, the skill value derivation section 216 derives the skill value of the user for activity A of interest to be "3." In a case where the group with group number 5 includes the play time of the user who has executed activity B, the skill value derivation section 216 derives the skill value of the user for activity B of interest to be "5."

The skill value derivation section 216 derives the skill value of the user for the game play on the basis of a plurality of skill values derived for a plurality of activities. Specifically, the skill value derivation section 216 derives the skill value of the user for a plurality of activities most recently executed by the user, and averages the plurality of derived skill values to derive the skill value of the user related to the game play. In Example 1, the skill value derivation section 216 averages 10 skill values derived for the most recent 10 activities to derive the skill value of the user for the game play. The skill value of the user for the game play may hereinafter be referred to as the "player skill value."

A specific example will be described in which the player skill value of a user X is derived. It should be noted that numerical values indicated in the specific example may include numerical values deviating from the above-described knowledge but are only for description of Examples.

The following indicates the group numbers of the groups including the play times for 10 activities most recently executed by the user X.

| Activity A | Group number 3 |
| Activity B | Group number 5 |
| Activity C | Group number 1 |
| Activity D | Group number 2 |
| Activity E | Group number 4 |
| Activity F | Group number 7 |
| Activity G | Group number 5 |
| Activity H | Group number 5 |
| Activity I | Group number 8 |
| Activity J | Group number 10 |

The skill value is represented by the group number, and thus the skill value of the user for each activity is derived as follows.

| Activity A | Skill value 3 |
| Activity B | Skill value 5 |
| Activity C | Skill value 1 |
| Activity D | Skill value 2 |
| Activity E | Skill value 4 |
| Activity F | Skill value 7 |
| Activity G | Skill value 5 |
| Activity H | Skill value 5 |
| Activity I | Skill value 8 |
| Activity J | Skill value 10 |

The skill value derivation section 216 averages the skill values derived for the 10 activities to derive the player skill value of the user X.

(player skill value)=(3+5+1+2+4+7+5+5+8+10)/10=5

As described above, the player skill value of the user X is derived to be "5" by averaging the skill values derived for the 10 activities.

The skill value derivation section 216 derives the player skill values of all the users and records the player skill values in the skill-value recording section 246. The player skill value ranges from a minimum value of 1 to a maximum value of 10. A user with a smaller player skill value may be said to have a higher game skill, and a user with a greater player skill value may be said to have a lower game skill.

As described above, the skill value derivation section 216 derives the player skill value on the basis of the skill values derived for a predetermined number of most recent activities. The skill value derivation section 216 may update the player skill value of the user each time the user executes an activity, but may periodically update the player skill value, for example, once a day.

<S14: Representative-Value Determination Processing>

In the statistical processing section 220, the class sorting section 224 sets a plurality of classes and sorts each of the players into a respective one of the plurality of classes according to the player skill value of the player. In Example 1, the class sorting section 224 sets nine classes and performs user sorting processing in accordance with the following rule. PS represents the player skill value.

| $1 \leq PS \leq 2$ | Class 1 |
| $2 < PS \leq 3$ | Class 2 |
| $3 < PS \leq 4$ | Class 3 |
| $4 < PS \leq 5$ | Class 4 |
| $5 < PS \leq 6$ | Class 5 |
| $6 < PS \leq 7$ | Class 6 |
| $7 < PS \leq 8$ | Class 7 |
| $8 < PS \leq 9$ | Class 8 |
| $9 < PS \leq 10$ | Class 9 |

The class sorting section 224 sorts the user X with the player skill value of "5" listed above into class 4. The class sorting section 224 sorts each of all the users joining the information processing system 1 into a respective one of classes 1 to 9 according to the player skill value, and records the class of each user in the skill-value recording section 246.

Figure 9:
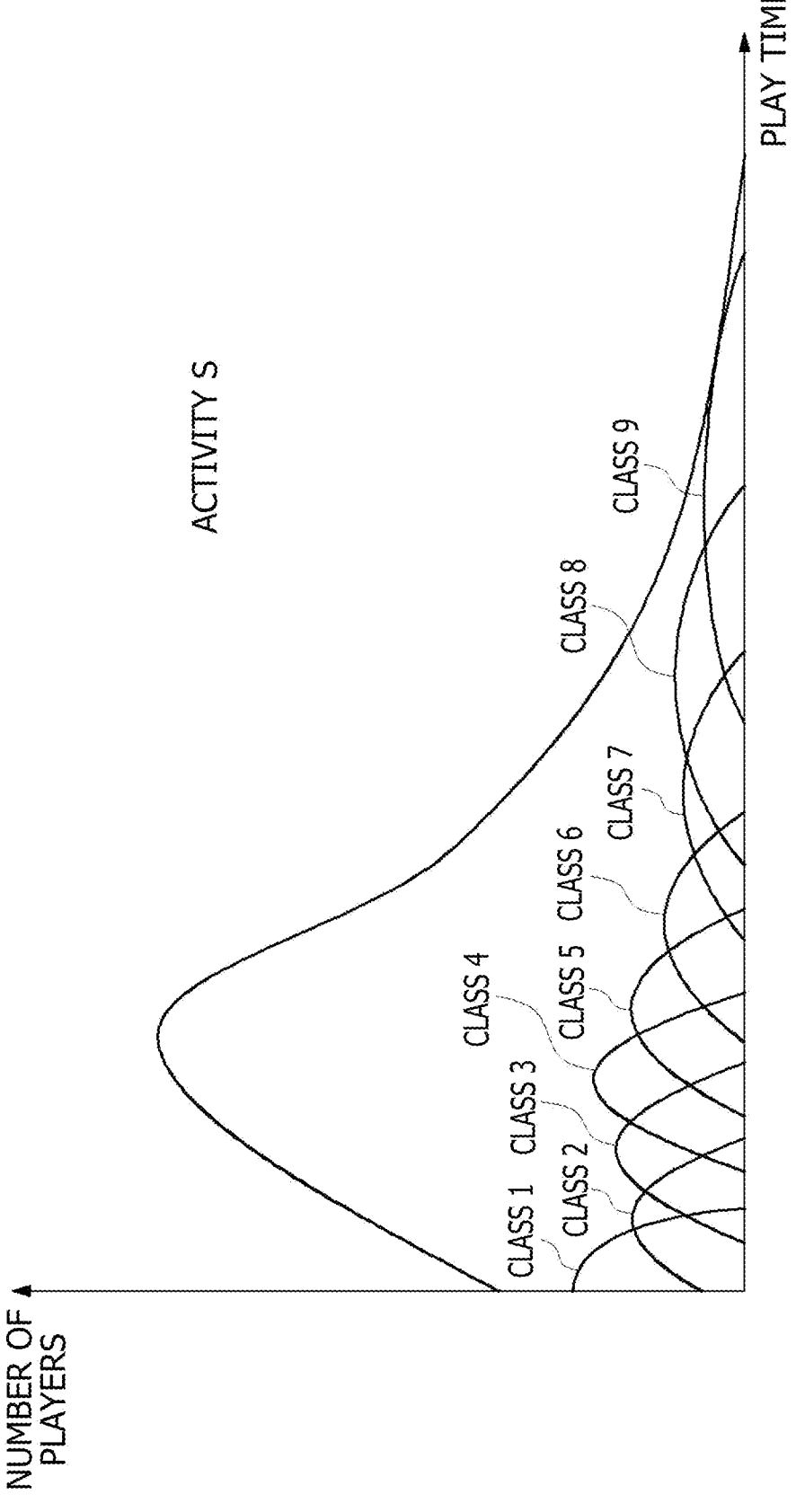
FIG. 9 is a diagram depicting a graph in which the players are plotted for each class.

FIG. 9 depicts a distribution curve indicating the relation between the play time for an activity S and the number of players, and also depicts graphs indicating players plotted for each class. The graph of class 1 indicates the relation between the play times of a plurality of players belonging to class 1 and the number of the players. The graph of class 2 indicates the relation between the play times of a plurality of players belonging to class 2 and the number of the players. In other words, the graph of class N (1 to 9) represents the play times of a plurality of players belonging to class N and the number of the players. Consequently, the graphs of all of classes 1 to 9 are aggregated into a distribution curve indicating the relation between the play times of all the users for activity S and the number of players. Note that different numbers of players may belong to the respective classes.

The representative-value determination section 226 determines, for each activity, a representative value for the play times in each class on the basis of the play times of the plurality of players in the class. The representative-value determination section 226 may derive the median of the plurality of play times as a representative value for each class. The representative-value determination section 226 determines the representative value (medN) of the play times in each class.

| Class 1 | med1 |
|---------|------|
| Class 2 | med2 |
| Class 3 | med3 |
| Class 4 | med4 |
| Class 5 | med5 |
| Class 6 | med6 |
| Class 7 | med7 |
| Class 8 | med8 |
| Class 9 | med9 |

The representative value of the play times determined for each class may be provided to a user who has not executed the activity as an expected play time. In a case where the user X belonging to class 4 has not activity S yet, the server apparatus 5 can notify the user X that "med4" is the play time expected when activity S is played.

The representative-value determination section 226 determines the representative value for each of classes 1 to 9 for all the activities, and records the classes and the representative values in the representative-value recording section 248 in association with one another. In Example 1, the representative value is a median, but may be a mean or a mode. The representative-value determination section 226 may periodically perform representative-value determination processing, for example, once a day. The analysis processing for the event data in Example 1 has been described.

The information provision section 230 notifies the user operating the information processing apparatus 10 of the expected play time for an activity not executed by the user yet. Specifically, the information provision section 230 notifies, to the user as an expected play time, the representative value for the play time associated with the class of the user or the time based on the representative value. The information provision section 230 may notify the expected play time at any timing.

The class acquisition section 232 acquires, from the skill-value recording section 246, the class to which the user operating the information processing apparatus 10 belongs. For example, when the user logs in to the information processing apparatus 10, the class acquisition section 232 may acquire, from the skill-value recording section 246, the class to which the user having logged in belongs. In connection with the activity that can be executed by the user, the play time extraction section 234 extracts, from the representative-value recording section 248, the representative value for the play time associated with the player skill value of the user or the representative value for the play time associated with the class of the user in the embodiment. The notification section 236 notifies the information processing apparatus 10 of the user of information related to the expected play time based on the extracted representative value for the play time. Note that the expected play time based on the representative value for the play time may be the representative value for the play time itself but may be a time obtained by slightly adjusting the representative value for the play time. For example, in a case where the representative value for the play time is 4.9 minutes, the notification section 236 may determine a nice round time (for example, 5 minutes) to be an expected play time. The notification section 236 may notify the information processing apparatus 10 of the user of information related to the expected play times for a plurality of activities.

In the information processing apparatus 10, the activity information acquisition section 150 acquires, from the server apparatus 5, information related to the expected play time for the activity. The display processing section 140 displays information acquired by the activity information acquisition section 150.

FIG. 10 depicts an example of a system screen displayed on the output apparatus 4. The display processing section 140 generates system images 180, 182, 184, and 186 from the information acquired by the activity information acquisition section 150 and displays the system images 180, 182, 184, and 186 on the output apparatus 4. The four system images 180, 182, 184, and 186 display expected play times for activities of different game titles. This allows the user to determine which game to play from the expected play time for each activity.

The system images 180, 182, 184, and 186 displayed in a card form may correspond to a GUI (Graphical User Interface), and for example, when the user selects one of the system images, the game corresponding to the system image may be automatically activated.

Example 2

Figure 11:
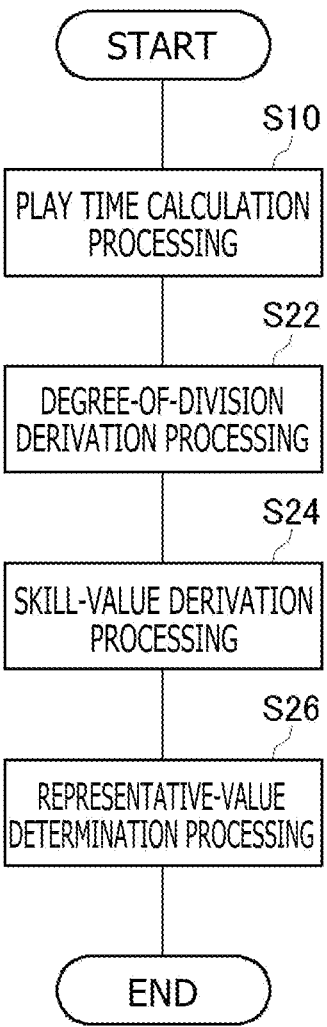
FIG. 11 is a diagram depicting a procedure for analyzing collected event data.

FIG. 11 depicts a procedure for analyzing event data collected in Example 2. Analysis of the event data includes play time calculation processing (S10) executed by the play time acquisition section 212, degree-of-division derivation processing (S22) executed by the degree-of-division derivation section 214, skill value derivation processing (S24) executed by the skill value derivation section 216, and representative-value determination processing (S26) executed by the representative-value determination section 226. The play time calculation processing (S10) in Example 2 may be the same as the play time calculation processing (S10) in Example 1.

A difference from Example 1 is that, in Example 2, the processing section 200 of the server apparatus 5 derives the degree of division of the activity and reflects the derived degree of division in the skill value derivation processing and the representative-value determination processing. Example 2 will be described with focus placed on the difference from Example 1.

<S22: Degree-of-Division Derivation Processing>

The degree-of-division derivation section 214 derives the degree of division of the activity. The degree of division of the activity is defined as the number of event data related to another activity occurring between the start and end of the activity. The degree-of-division derivation section 214 counts the number of event data related to another activity occurring between the start and end of the activity.

Figure 12:
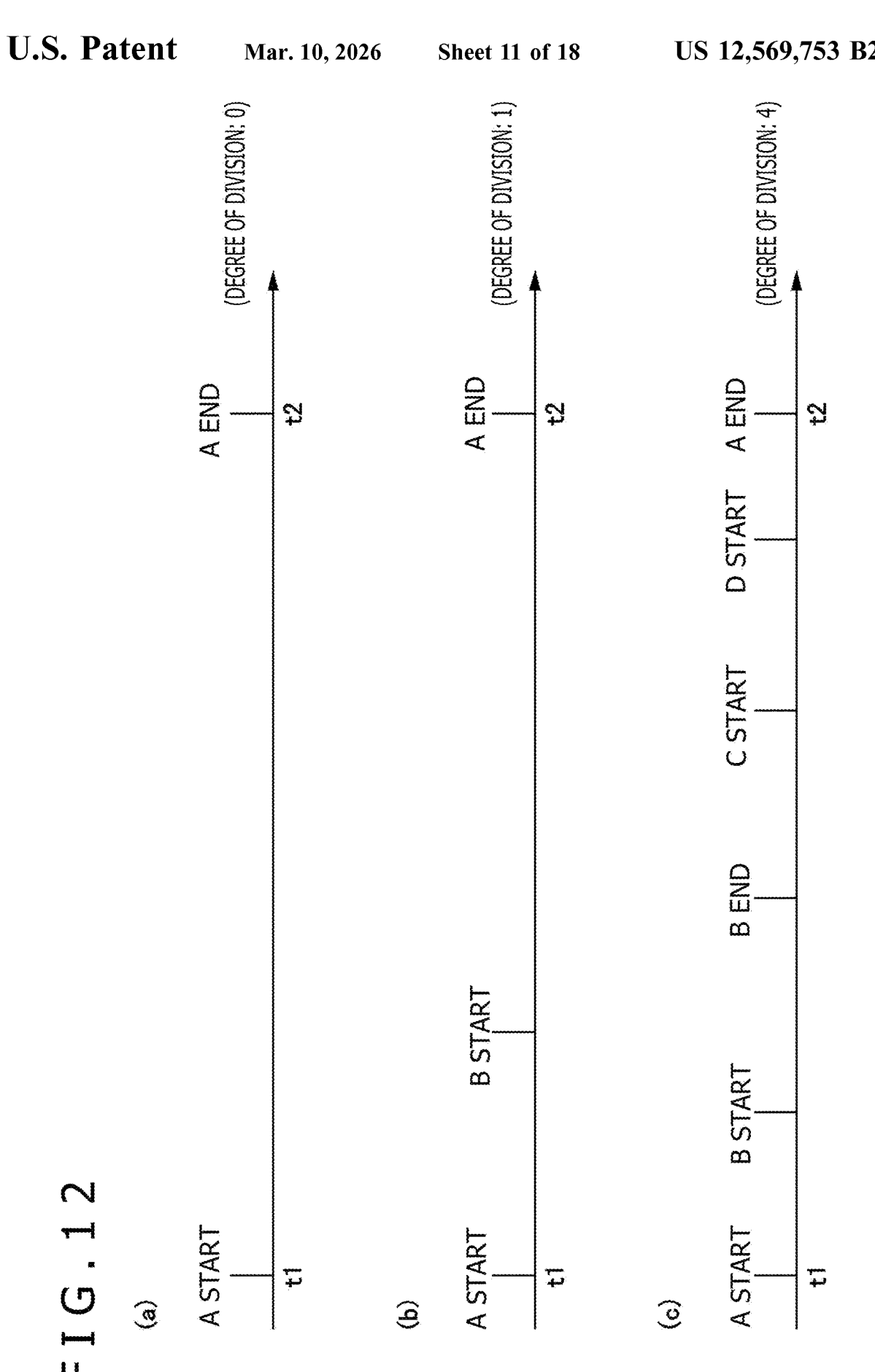
FIG. 12 is a diagram depicting an example of events chronologically arranged.

FIGS. 12(*a*) to 12(*c*) depict examples of chronologically arranged events. In FIGS. 12(*a*) to 12(*c*), activity A is started at time t1 and ended at time t2.

FIG. 12(*a*) depicts an example of chronologically arranged events. In this example, no other activity is started between the start and end of activity A. Thus, the degree-of-division derivation section 214 derives the degree of division of the activity to be "0."

FIG. 12(*b*) depicts another example of chronologically arranged events. In this example, activity B is started between the start and end of activity A, leading to occurrence of a start event for activity B. Since the number of event data related to another activity occurring between the start and end of activity A is "1," the degree-of-division derivation section 214 derives the degree of division of activity A to be "1."

FIG. 12(*c*) depicts another example of chronologically arranged events. In this example, activities B, C, and D are started, leading to occurrence of start events for the activities B, C, and D, and then activity B is ended, leading to occurrence of an end event for the activity B, between the start and end of activity A. Since the number of event data related to other activities occurring between the start and end of activity A is "4," the degree-of-division derivation section 214 derives the degree of division of activity A to be "4."

The degree-of-division derivation section 214 records the derived degree of division in the play time recording section 242 in association with the play time for the activity. In Example 2, the degree of division of the activity may be utilized as a parameter for evaluating the degree of concentration of the player on the activity. A degree of division of "0" is a parameter value assumed to indicate the highest concentration of the player on the activity, and a higher degree of division is assumed to indicate a stronger likelihood that the player is paying attention to an activity other than the activity of interest.

For example, in an event time series depicted in FIG. 12(*a*), no other activity is started between the start and end of activity A (degree of division "0"), and thus the player is assumed to have been able to concentrate on activity A. On the other hand, in an event time series depicted in FIG. 12(*c*), three activities are started between the start and end of activity A (degree of division "4"), and thus the player is assumed to be likely to be paying attention to an activity other than activity A.

The degree of division of the activity is an indicator related to the reliability of the play time. In other words, a lower degree of division indicates that the player is more likely to concentrate on the activity, and thus the play time calculated on the basis of the event data may be said to have higher reliability. On the other hand, a higher degree of division indicates that the player is more likely to be distracted by another activity, leading to lower reliability of the calculated play time. Thus, in Example 2, the skill value derivation section 216 and the statistical processing section 220 may perform processing for adjusting the skill value and the play time according to the degree of division.

FIG. 13 depicts the relation between the degree of division of the activity and the reliability of the calculated play time. In Example 2, the equation below defines the relation between the degree of division m of the activity and the reliability w of the play time.

$$\text{Reliability } w \text{ of the play time} = (\tfrac{1}{2})^m \qquad (1)$$

The skill value derivation section 216 and the statistical processing section 220 adjust the skill value and the play time using the reliability w of the play time associated with the degree of division of the activity. A specific adjustment method will be described below.

As described above, the game developer can freely set activities, and can cause one activity to be automatically started in conjunction with the start of another activity. In this case, the player often concentratedly executes the initially started activity without regard to the start of the succeeding activity.

Figure 14:
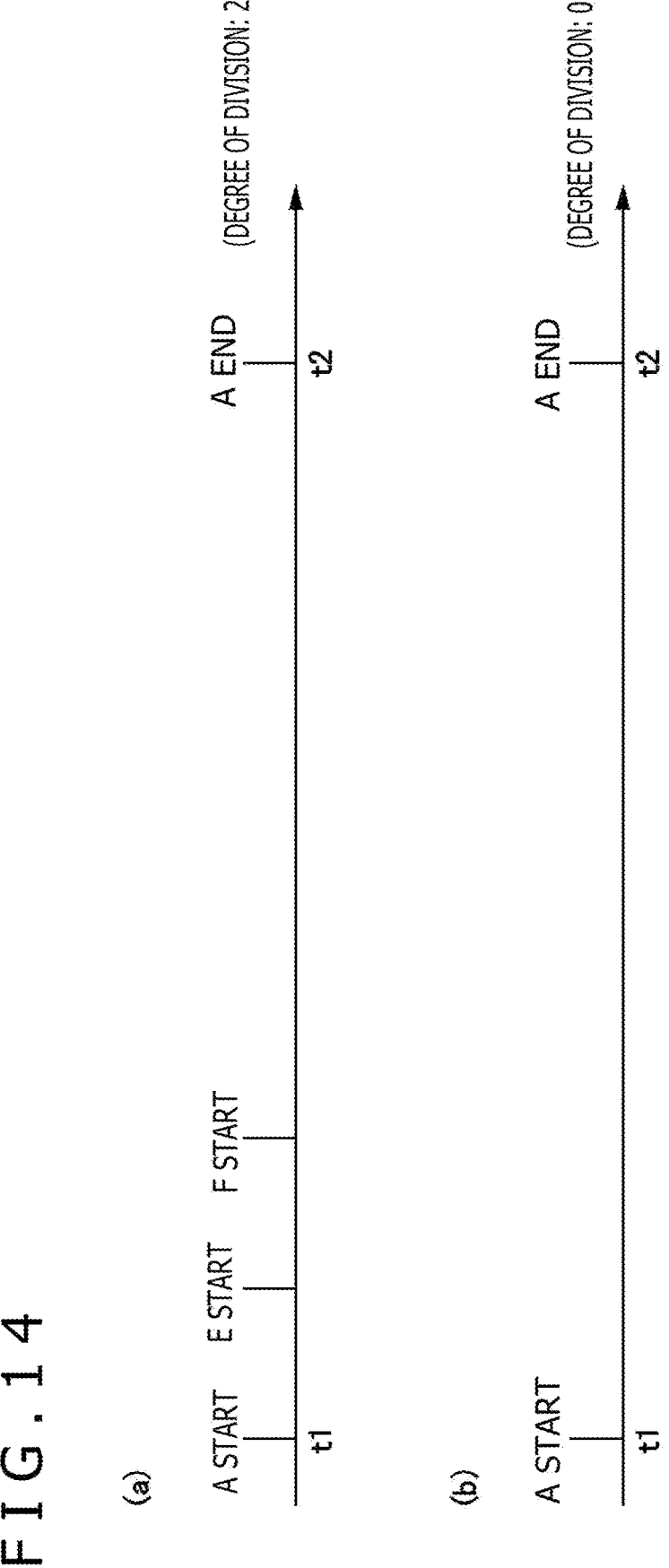
FIG. 14 is a diagram depicting another example of events chronologically arranged.

FIG. 14(*a*) depicts another example of chronologically arranged events. In this example, activities E and F are started between the start and end of activity A, leading to occurrence of start events for the activities E and F. As described above, the degree-of-division derivation section 214 derives the degree of division of activity A to be "2."

The degree-of-division derivation section 214 includes a function to self-analyze a plurality of degree of divisions derived. The degree-of-division derivation section 214 may self-analyze, at a predetermined timing, a plurality of degrees of divisions derived for the activity. As a result, upon confirming that the degree of division of activity A has a minimum value of 2 and that start events for the activities E and F inevitably occur between the start and end of activity A, the degree-of-division derivation section 214 configures the activities E and F to reliably start automatically in conjunction with the start of activity A.

When the activities E and F are configured to reliably start automatically in conjunction with the start of activity A, the player is assumed to concentratedly execute activity A without regard to the start of the activities E and F. Thus, the calculated play time for activity A is considered to have high reliability. Thus, the degree-of-division derivation section 214 does not count the start event data for the activities E and F automatically started in conjunction with the start of activity A. In other words, when counting the event data related to another activity occurring between the start and end of activity A, the degree-of-division derivation section 214 does not count the event data related to the other activity in a case where the other activity is started in conjunction with the start of activity A of interest.

FIG. 14(*b*) illustrates the event time series depicted in FIG. 14(*a*) from which automatically started events have been excluded. As illustrated in FIG. 14(*b*), the start events for the activities E and F have been excluded from the event time series depicted in FIG. 14(*a*). Thus, the degree-of-division derivation section 214 derives the degree of division of activity A to be "0." In such a manner, the degree-of-division derivation section 214 preferably derives the degree of division by excluding the event data related to the activities automatically started in conjunction with start of one activity. Note that, in a case where the degree of division exceeds a predetermined value (for example, 10), the calculated play time is considered to have significantly low reliability, and may thus be discarded.

<S24: Skill Value Derivation Processing>

In the statistical processing section 220, the distribution generation section 222 generates, on the basis of a plurality of play times acquired by the play time acquisition section 212, the distribution of the play times for each activity. The distribution generation section 222 records, in the play time distribution recording section 244, the distribution of the play times generated for each activity.

As described in Example 1, the distribution generation section 222 divides all the players into a plurality of groups each including an equal number of players by arranging, for each activity, all the players in order of increasing play time. The distribution generation section 222 records, in the play time distribution recording section 244, the distribution of the play times generated for each activity. Also in Example 2, the play time distribution recording section 244 records, as the distribution of the play times, the group number ranging from 1 to 10 and the shortest play time and longest play time included in each group.

The skill value derivation section 216 derives the skill value of the user for the activity on the basis of the play time of the user for the activity and the distribution of the play times for the activity. The skill value derivation section 216 derives the skill value of the user for the activity by referencing the play time distribution recorded in the play time distribution recording section 244 to determine the group number of the group including the play time of the user. Also in Example 2, the group number represents the skill value.

The skill value derivation section 216 derives the skill value for the user related to the game play on the basis of a plurality of skill values derived for a plurality of activities and the number of event data related to another activity occurring between the start and end of each activity. First, the skill value derivation section 216 derives the skill value of the user for a plurality of activities most recently executed by the user.

In Example 2, the skill value derivation section 216 derives the skill value for 10 activities most recently executed by the user X as follows.

| | |
|---|---|
| Activity A | Skill value 3 |
| Activity B | Skill value 5 |
| Activity C | Skill value 1 |
| Activity D | Skill value 2 |
| Activity E | Skill value 4 |
| Activity F | Skill value 7 |
| Activity G | Skill value 5 |
| Activity H | Skill value 5 |
| Activity I | Skill value 8 |
| Activity J | Skill value 10 |

The degree-of-division derivation section 214 derives the degrees of division for the activities A to J executed by the user X as follows.

| | |
|---|---|
| Activity A | Degree of division 0 |
| Activity B | Degree of division 0 |
| Activity C | Degree of division 0 |
| Activity D | Degree of division 0 |
| Activity E | Degree of division 2 |
| Activity F | Degree of division 2 |
| Activity G | Degree of division 3 |
| Activity H | Degree of division 3 |
| Activity I | Degree of division 3 |
| Activity J | Degree of division 3 |

FIG. 15 is a diagram illustrating a calculation process for the player skill value with the degree of division taken into account.

In FIG. 15, the top stage depicts the skill value for the activity, and the stage immediately below the top stage depicts the degree of division of the activity. The skill value derivation section 216 extracts, from a correspondence table depicted in FIG. 13, the reliability of the play time associated with the degree of division, and normalizes the reliability of extracted 10 reliabilities. Note that the skill value derivation section 216 may extract the reliability using Equation (1). The normalized reliability is utilized as a weight coefficient by which the skill value is multiplied, and the skill value derivation section 216 multiplies the skill value by (normalized weight) to adjust the skill value. The skill value derivation section 216 calculates the sum of (skill value×normalized weight) to derive the player skill value. In the example depicted in FIG. 15, the player skill value is calculated to be "3.45."

The skill value derivation section 216 derives the player skill values of all the users and records the player skill values in the skill-value recording section 246. The player skill value takes a value ranging from a minimum value of 1 to a maximum value of 10. In Example 2, the skill value derivation section 216 can derive the player skill value with the reliability of the derived skill value taken into account by adjusting the skill value derived for one activity according to the number of event data related to another activity occurring between the start and end of the one activity.

<S26: Representative-Value Determination Processing>

In the statistical processing section 220, the class sorting section 224 sets a plurality of classes and sorts each of the players into a respective one of the plurality of classes according to the player skill value of the player. In Example 2, the class sorting section 224 sets nine classes and executes user sorting processing according to the rule described below. PS represents the player skill value.

| | |
|---|---|
| $1 \leq PS \leq 2$ | Class 1 |
| $2 < PS \leq 3$ | Class 2 |
| $3 < PS \leq 4$ | Class 3 |
| $4 < PS \leq 5$ | Class 4 |
| $5 < PS \leq 6$ | Class 5 |
| $6 < PS \leq 7$ | Class 6 |
| $7 < PS \leq 8$ | Class 7 |
| $8 < PS \leq 9$ | Class 8 |
| $9 < PS \leq 10$ | Class 9 |

The class sorting section 224 sorts each of all the users joining the information processing system 1 into a respective one of classes 1 to 9 according to the player skill value, and records the class of each user in the skill-value recording section 246.

The representative-value determination section 226 determines, for each activity, a representative value for the play times in each class on the basis of the play times of the plurality of players in the class and the number of event data related to another activity occurring between the start and end of the activity of each player. The representative-value determination section 226 may derive the median of the plurality of play times as a representative value for each class.

A technique for determining, for an activity T, the representative value for the play times of players A to E belong to the same class in Example 2. The play time acquisition section 212 acquires the play times of the players A to E as described below.

| | |
|---|---|
| Player A | 5 minutes |
| Player B | 10 minutes |
| Player C | 15 minutes |
| Player D | 20 minutes |
| Player E | 25 minutes |

As described in Example 1, in a case where the representative-value determination section 226 derives the median of five play times, the median of the play times is "15 minutes." In Example 2, the representative-value determination section 226 determines the representative value for the play times with the reliability value of the play time taken into account.

The degree-of-division derivation section 214 derives the degrees of division of activity T executed by the users A to E as follows.

| Player A | Degree of division 0 |
|----------|----------------------|
| Player B | Degree of division 2 |
| Player C | Degree of division 1 |
| Player D | Degree of division 3 |
| Player E | Degree of division 1 |

FIG. 16 is a diagram illustrating a calculation process for the representative value for the play times with the degree of division taken into account. The representative-value determination section 226 determines the representative value for the play times on the basis of the play times of a plurality of players in each class and the degree of division of the activity executed by each player.

In FIG. 16, the top stage depicts the play time of each player, and the stage immediately below the top stage depicts the degree of division of the activity. The representative-value determination section 226 extracts, from the correspondence table depicted in FIG. 13, the reliability of the play time associated with the degree of division, and determines, from the extracted reliability, the number of duplicates of each play time utilized when the median is determined. Note that the skill value derivation section 216 may extract the reliability using Equation (1).

Here, the median of the play times in each class is derived as the play time located at the center when the play times are arranged in order of increasing play time. However, the number of duplicates of the play time in Example 2 corresponds to the number of duplicates when the play times are arranged. As described above, the reliability of play time varies according to the degree of division. Thus, to increase the effect of the play time with high reliability on the determination of the median while reducing the effect of the play time with low reliability on the determination of the median, the number of duplicates of the play time with high reliability is increased while the number of duplicates of the play time with low reliability is reduced, thus increasing the reliability of the median to be derived.

The representative-value determination section 226 determines the number of duplicates using Equation (2) below. When the maximum degree of division in the class is designated as DSmax, the following equation holds as follows:

$$(\text{Number of duplicates}) = 2^{(DSmax-degree\ of\ division)} \quad (2)$$

In the example of degree of division depicted in FIG. 16, DSmax=3 holds. Consequently, the representative-value determination section 226 derives the number of duplicates as depicted in the lowermost stage in FIG. 16. The number of duplicates 8 derived for the play time of player A means that eight play times of player A are arranged when the median is determined.

The representative-value determination section 226 determines the number of duplicates of the play time of each player and increases the number of play times in such a manner that the number is equal to the number of duplicates before determining the median of a plurality of play times. In the example depicted in FIG. 16, the representative-value determination section 226 determines the median of a set of a plurality of play times described below. {5, 5, 5, 5, 5, 5, 5, 5, 10, 10, 15, 15, 15, 15, 25, 30, 30, 30, 30}

By increasing the number of play times to a value represented as the number of duplicates, the set of play times includes a total of 19 play times. Consequently, the representative-value determination section 226 determines "10 minutes" located at the 10th position from the minimum value to be the median of the play times in the class. In Example 2, the representative-value determination section 226 determines the number of duplicates of each play time utilized when the median is determined, according to the number of event data related to another activity occurring between the start and end of an activity, increases the number of play times in such a manner that the number is equal to the number of duplicates, and determines the median of the plurality of play times from the set of the resultant play times. This allows the representative value to be derived with the reliability of the play time taken into account.

FIG. 17 depicts an example of the representative value for the play time derived for each class. The representative-value determination section 226 determines, for each activity, the representative values for the play times in classes 1 to 9, and records the representative values in the representative-value recording section 248.

Figure 18:
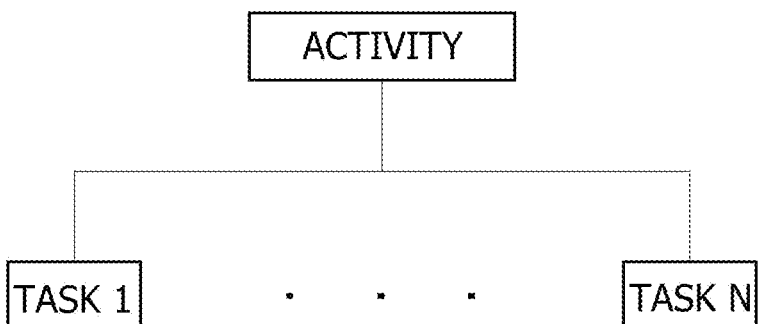
FIG. 18 is a diagram depicting an example of a relation between an activity and tasks.

FIG. 18 depicts an example of a relation between an activity and tasks. The game developer may configure one activity using a plurality of tasks. The game developer can freely embed events in a game program, and can thus set the start event and the end event only in the task rather than setting the start event and the end event in the activity. In particular, in a case where the task includes a substance while the activity includes no substance (in a case where the activity is simply utilized as a concept for uniting a plurality of tasks), no events are often set in the activity.

The event data acquisition section 210 acquires event data related to an activity executed by a plurality of players and records the event data in the event data recording section 240. The event data related to the activity includes event data indicating the start of a task included in the activity and event data indicating the end of the task included in the activity. The event data includes at least the game ID, the activity ID, the identifier identifying the task (task ID), the information indicating the start or end of the activity, and the time stamp.

The play time acquisition section 212 acquires the play time for the task. The play time acquisition section 212 acquires the play times of a plurality of players for the task from the event data including the task start event information (start event data) and the event data including the task end event information (end event data). The task play time is calculated on the basis of the time stamp included in the start event data and the time stamp included in the end event data.

As described above, the statistical processing section 220 sorts players into a respective plurality of classes and determines the representative value for the play times in each class from the play times of a plurality of players in each class. A case will be described below where activity U includes three tasks 1 to 3. For example, activity U may be a mission to defeat three enemy characters, task 1 may be a mission to confront enemy character 1, task 2 may be a mission to confront enemy character 2, and task 3 may be a mission to confront enemy character 3.

FIGS. 19(*a*) to 19(*c*) depict representative values for the play times in classes 1 to 9 for each task. FIG. 19(*a*) depicts the representative value for the play times for task 1, FIG. 19(*b*) depicts the representative value for the play times for task 2, and FIG. 19(*c*) depicts the representative value for the play times for task 3. The method for determining the representative value for the play times for each task is as described above. The representative-value determination section 226 determines the representative values for the play times in each class for a plurality of tasks, and records the representative values in the representative-value recording section 248.

After determining the representative values for the play times in each class for a plurality of tasks, the representative-value determination section 226 aggregates the representative values for each class and determines the representative value for the play times in each class of the activity.

FIG. 19(d) depicts the representative values for the play times in classes 1 to 9 of activity U. The representative-value determination section 226 sets addition value obtained by adding play time representative values for tasks 1 to 3 together for each class, as a play time representative value for each class of the activity. Thus, even in a case where no events are set for activity U itself, the representative-value determination section 226 can derive the representative value for the play times for the activity by evaluating the play times for a plurality of tasks constituting the activity.

The present invention has been described on the basis of the embodiment. A person skilled in the art understands that the embodiment is illustrative and that variations can be made to combinations of components and processes of the embodiment and that such variations are within the scope of the present invention.

INDUSTRIAL APPLICABILITY

The present invention can be utilized for technical fields in which event data related to game activities is processed.

REFERENCE SIGNS LIST

1: Information processing system
5: Server apparatus
10: Information processing apparatus
100: Processing section
102: Communication section
110: Game software
120: Event information acquisition section
122: Event data transmission section
130: Game image generation section
140: Display processing section
150: Activity information acquisition section
200: Processing section
202: Communication section
210: Event data acquisition section
212: Play time acquisition section
214: Degree-of-division derivation section
216: Skill value derivation section
220: Statistical processing section
222: Distribution generation section
224: Class sorting section
226: Representative-value determination section
230: Information provision section
232: Class acquisition section
234: Play time extraction section
236: Notification section
240: Event data recording section
242: Play time recording section
244: Play time distribution recording section
246: Skill-value recording section
248: Representative-value recording section

The invention claimed is:
1. A system comprising:
a server apparatus configured to perform processing comprising:

acquiring, from a plurality of information processing apparatuses, event data related to an activity executed by a plurality of players on the plurality of information processing apparatuses;

analyzing the event data related to the activity to generate data corresponding to a play status of each of the plurality of players, wherein the analyzing comprises determining a play time of each of the plurality of players for the activity based on data in the event data indicating a start of the activity and an end of the activity;

sorting each of the plurality of players into any one of a plurality of classes according to a skill value of the player;

determining, on a basis of the play times of the plurality of players in each class, a representative value for the play times in each class;

recording the determined representative value for the play times in each class; and transmitting a determined representative value for the play time in a class to an information processing apparatus according to a skill value of a player of the information processing apparatus, wherein the determined representative value is displayed on an output apparatus connected to the information processing apparatus.

2. The system according to claim 1, wherein the representative value for the play times in each class is derived on a basis of the play times of the plurality of players in each class and event data related to another activity occurring between the start of the activity and end of the activity executed by each player.

3. The system according to claim 1, wherein the representative value for the play times is a median of a plurality of play times.

4. The system according to claim 3, wherein duplicates of each play time utilized to determine the median, according to an amount of event data related to the other activity occurring between the start of the activity and the end of the activity executed by each player, increase play time for each player in accordance with a number of the duplicates before determining the median of the plurality of play times.

5. The system according to claim 3, further comprising:
counting a number of event data related to the other activity occurring between the start of the activity and end of the activity, wherein,
when counting the number of event data related to the other activity occurring between the start of the activity and end of the activity, the event data related to the other activity in a case where the other activity is started in conjunction with start of the activity is not counted.

6. The system according to claim 1, further comprising:
notifying a user of information related to a predicted play time based on the representative value for the play times associated with the class of the user.

7. A method comprising:
acquiring, by a server apparatus from a plurality of information processing apparatuses, event data related to an activity executed by a plurality of players on the plurality of information processing apparatuses;

analyzing, by the server apparatus, the event data related to the activity to generate data corresponding to a play status of each of the plurality of players, wherein the analyzing comprises determining a play time of each of the plurality of players for the activity based on data in the event data indicating a start of the activity and an end of the activity;

sorting, by the server apparatus, each of the plurality of players into any one of a plurality of classes according to a skill value of the player;

determining, by the server apparatus on a basis of the play times of the plurality of players in each class for the activity, a representative value for the play times in each class;

transmitting, by the server apparatus to an information processing apparatus, a determined representative value for the play time in a class according to a skill value of a player of the information processing apparatus, wherein the determined representative value is displayed on an output apparatus connected to the information processing apparatus.

8. The method of claim 7, wherein a predicted play time is provided to the information processing apparatus in real time based on the representative value recorded for the class associated with the player of the information processing apparatus.

9. A memory storing instructions which, when executed by a server apparatus, cause the server apparatus to perform processing comprising:

acquiring, from a plurality of information processing apparatuses, event data related to an activity executed by a plurality of players on the plurality of information processing apparatuses;

analyzing the event data related to the activity to generate data corresponding to a play status of each of the plurality of players, wherein the analyzing comprises determining a play time of each of the plurality of players for the activity based on data in the event data indicating a start of the activity and an end of the activity;

sorting each of the plurality of players into any one of a plurality of classes according to a skill value of the player;

determining, on a basis of the play times of the plurality of players in each class for the activity, a representative value for the play times in each class;

recording the determined representative value for the play times in each class; and transmitting a determined representative value for the play time in a class to an information processing apparatus according to a skill value of a player of the information processing apparatus, wherein the determined representative value is displayed on an output apparatus connected to the information processing apparatus.

* * * * *